United States Patent
Fan et al.

(10) Patent No.: US 10,776,578 B2
(45) Date of Patent: Sep. 15, 2020

(54) METHOD AND APPARATUS FOR BUILDING SYNONYMY DISCRIMINATING MODEL AND METHOD AND APPARATUS FOR DISCRIMINATING SYNONYMOUS TEXT

(71) Applicant: BAIDU ONLINE NETWORK TECHNOLOGY (BEIJING) CO., LTD., Haidian District Beijing (CN)

(72) Inventors: Miao Fan, Haidian District Beijing (CN); Mingming Sun, Haidian District Beijing (CN); Wutao Lin, Haidian District Beijing (CN); Ping Li, Haidian District Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 142 days.

(21) Appl. No.: 16/118,104

(22) Filed: Aug. 30, 2018

(65) Prior Publication Data
US 2019/0095429 A1 Mar. 28, 2019

(30) Foreign Application Priority Data
Sep. 27, 2017 (CN) .......................... 2017 1 0890961

(51) Int. Cl.
G06F 17/27 (2006.01)
G06F 40/247 (2020.01)
G06N 3/08 (2006.01)
G06F 40/30 (2020.01)
G06F 40/242 (2020.01)
G06F 17/21 (2006.01)

(52) U.S. Cl.
CPC .......... *G06F 40/247* (2020.01); *G06F 40/242* (2020.01); *G06F 40/30* (2020.01); *G06N 3/08* (2013.01)

(58) Field of Classification Search
CPC ...... G06F 40/247; G06F 40/30; G06F 40/242; G06N 3/08; G06N 3/045
USPC ........................................................... 704/9
See application file for complete search history.

*Primary Examiner* — Thierry L Pham
(74) *Attorney, Agent, or Firm* — Brooks Kushman PC

(57) ABSTRACT

A method for building the synonymy discriminating model comprises: obtaining a text pair in training samples; using a word vector dictionary to obtain a quantization matrix of texts in the text pair; regarding the quantization matrix of respective texts as input of a convolutional neural network, regarding a synonymy annotation result corresponding to the text pair as output of the convolutional neural network, and training the convolutional neural network to obtain a synonymy discriminating model. The method for discriminating the synonymous text comprises: obtaining a text pair to be discriminated; using a word vector dictionary to obtain a quantization matrix corresponding to texts in the text pair; regarding the quantization matrix of the texts as input of a synonymy discriminating model, and determining a synonymy discrimination result of the text pair according to output of the synonymy discriminating model.

22 Claims, 4 Drawing Sheets

METHOD AND APPARATUS FOR BUILDING SYNONYMY DISCRIMINATING MODEL AND METHOD AND APPARATUS FOR DISCRIMINATING SYNONYMOUS TEXT

The present application claims the priority of Chinese Patent Application No. 201710890961.8, filed on Sep. 27, 2017, with the title of "Method and apparatus for building synonymy discriminating model and method and apparatus for discriminating synonymous text". The disclosure of the above applications is incorporated herein by reference in its entirety.

FIELD OF THE DISCLOSURE

The present disclosure relates to natural language processing technologies, and particularly to a method and apparatus for building a synonymy discriminating model and a method and apparatus for discriminating a synonymous text.

BACKGROUND OF THE DISCLOSURE

A synonymous sentence discriminating method has always been a research subject to be solved and improved, wherein a method of using a computer to automatically discriminate synonymous sentences is a core of the research subject. Many Internet applications need to depend on the method of accurately discriminating synonymous sentences, for example, a search engine seeks for a document semantically identical with or similar to a query requested by a user, or a question-answer platform seeks for a set of questions synonymous with new questions raised by the user. However, on account of diversity of natural language sentence structures, polysemy of vocabulary expressions and difference of language types, the prior art, upon performing synonymous sentence discrimination, further needs to perform auxiliary processing by depending on auxiliary tools such as a word segmentation tool, part of speech analysis, and sentence template extraction. Therefore, the prior art is limited by various auxiliary tools in computation accuracy of synonymous sentence discrimination results.

SUMMARY OF THE DISCLOSURE

A technical solution employed by the present disclosure to solve the technical problems is to provide a method for building a synonymy discriminating model. The method comprises: obtaining a text pair in training samples; using a word vector dictionary to obtain a quantization matrix of texts in the text pair; regarding the quantization matrix of respective texts as input of a convolutional neural network, regarding a synonymy annotation result corresponding to the text pair as output of the convolutional neural network, and training the convolutional neural network to obtain a synonymy discriminating model; the synonymy discriminating model is used to discriminate whether the input text pair are synonymous.

According to a preferred embodiment of the present disclosure, the using a word vector dictionary to obtain a quantization matrix of texts in the text pair comprises: obtaining characters included by texts in the text pair; using the word vector dictionary to respectively determine feature vectors of the characters included by the respective texts; joining the obtained feature vectors, thereby obtaining the quantization matrix of texts in the text pair.

According to a preferred embodiment of the present disclosure, upon training the convolutional neural network, the method comprises: performing convolution processing for the quantization matrix of the texts at a convolutional layer according to a preset step length and window length, and using the obtained convolutional features to form a convolutional feature matrix of the texts.

According to a preferred embodiment of the present disclosure, upon training the convolutional neural network, the method comprises: performing multi-granularity pooling processing for the convolutional feature matrix at the pooling layer, to respectively obtain multi-granularity semantic features of the texts.

According to a preferred embodiment of the present disclosure, upon training the convolutional neural network, the method comprises: using semantic features with the same granularity corresponding to texts in the text pair to build matching feature vectors with granularities of the text pair; joining the built matching feature vectors with granularities of the text pair, to obtain a matching feature of the text pair.

According to a preferred embodiment of the present disclosure, upon training the convolutional neural network, the method comprises: mapping the matching feature of the text pair to the synonymy annotation result of the text pair at a fully connected layer, and using an error between a mapping result and the annotation result to adjust parameters of the convolutional neural network and the word vector dictionary.

A technical solution employed by the present disclosure to solve the technical problems is to provide an apparatus for building a synonymy discriminating model. The apparatus comprises: a first obtaining unit configured to obtain a text pair in training samples; a first quantization unit configured to use a word vector dictionary to obtain a quantization matrix of texts in the text pair; a training unit configured to regard the quantization matrix of respective texts as input of a convolutional neural network, regard a synonymy annotation result corresponding to the text pair as output of the convolutional neural network, and train the convolutional neural network to obtain a synonymy discriminating model; the synonymy discriminating model is used to discriminate whether the input text pair are synonymous.

According to a preferred embodiment of the present disclosure, upon training the convolutional neural network, the training unit specifically executes: performing convolution processing for the quantization matrix of the texts at a convolutional layer according to a preset step length and window length, and using the obtained convolutional features to form a convolutional feature matrix of the texts.

A technical solution employed by the present disclosure to solve the technical problems is to provide a method for discriminating a synonymous text. The method comprises: obtaining a text pair to be discriminated; using a word vector dictionary to obtain a quantization matrix corresponding to texts in the text pair; regarding the quantization matrix of the texts as input of a synonymy discriminating model, and determining a synonymy discrimination result of the text pair according to output of the synonymy discriminating model.

According to a preferred embodiment of the present disclosure, when the synonymy discriminating model processes the quantization matrix of the texts, the method comprises: performing convolution processing for the quantization matrix of the texts at a convolutional layer according to a preset step length and window length, and using the obtained convolutional features to form a convolutional feature matrix of the texts.

According to a preferred embodiment of the present disclosure, when the synonymy discriminating model processes the quantization matrix of the texts, the method comprises: performing multi-granularity pooling processing for the convolutional feature matrix at the pooling layer, to respectively obtain multi-granularity semantic features of the texts.

According to a preferred embodiment of the present disclosure, when the synonymy discriminating model processes the quantization matrix of the texts, the method comprises: using semantic features with the same granularity corresponding to texts in the text pair to build matching feature vectors with granularities of the text pair; joining the built matching feature vectors with granularities of the text pair, to obtain a matching feature of the text pair.

According to a preferred embodiment of the present disclosure, when the synonymy discriminating model processes the quantization matrix of the texts, the method comprises: obtaining a synonymy calculation result of the text pair at a fully connected layer according to the matching feature.

According to a preferred embodiment of the present disclosure, determining the synonymy discrimination result of the text pair according to the output of the synonymy discriminating model comprises: if the synonymy calculation result meets the requirement of a preset threshold, the synonymy discrimination result of the text pair is a synonymous sentence, otherwise not a synonymous sentence.

A technical solution employed by the present disclosure to solve the technical problems is to provide an apparatus for discriminating a synonymous text. The apparatus comprises: a second obtaining unit configured to obtain a text pair to be discriminated; a second quantization unit configured to use a word vector dictionary to obtain a quantization matrix corresponding to texts in the text pair; a discriminating unit configured to regard the quantization matrix of the texts as input of a synonymy discriminating model, and determine a synonymy discrimination result of the text pair according to output of the synonymy discriminating model.

According to a preferred embodiment of the present disclosure, upon processing the quantization matrix of the texts, the synonymy discriminating model specifically executes: performing convolution processing for the quantization matrix of the texts at a convolutional layer according to a preset step length and window length, and using the obtained convolutional features to form a convolutional feature matrix of the texts.

As can be seen from the above technical solutions of the present disclosure, it is possible to, by pre-building a synonymy discriminating model based on the convolutional neural network, directly obtain the synonymy discrimination result of the text pair according to the input text pair, reduce dependence on auxiliary tools such as a word segmentation tool, part of speech analysis, and a sentence template, and improve the accuracy of the synonymy discrimination result of the text pair.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when (stated condition or event) is detected" or "responsive to detecting (stated condition or event)".

Figure 1:
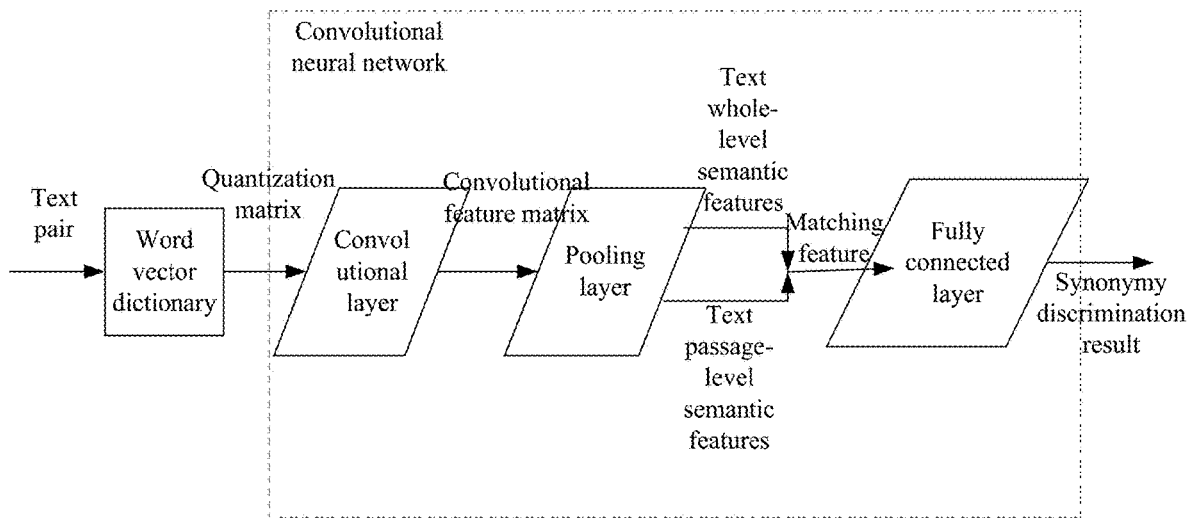
FIG. 1 is a structural diagram of a building a synonymy discriminating model according to an embodiment of the present disclosure.

A kernel idea of the present disclosure lies in, as shown in FIG. 1, first using a word vector dictionary to obtain a quantization matrix of a text pair; then inputting the quantization matrix into a pre-built synonymy discriminating model and obtaining a synonymy calculation result of the text pair. A specific process is as follows: obtaining a convolution feature matrix of the text pair through a convolution layer of the model; inputting the convolution feature matrix of the texts into a pooling layer, and then obtaining semantic features of the text pair with multiple granularities (FIG. 1 and embodiments of the present disclosure take two granularities as an example); then building matching features of the text pair according to the semantic features; inputting the matching features into a fully connected layer, and then obtaining the synonymy calculation result of the text pair. It is possible to, by the abovementioned method, reduce dependence on extra auxiliary tools and improve the accuracy of text synonym discrimination upon discriminating whether the text pair is synonymous.

First, description is presented for the method for building the synonymy discriminating model. In the present disclosure, the synonymy discriminating model is a convolutional neural network model.

Specifically, it is possible to pre-build to obtain the synonymy discriminating model in the following manner:

(1) Obtaining a text pair in training samples.

In this step, the text pair obtained from the training samples is pre-annotated with a synonym result of the text pair, namely, it is possible to know whether the text pair is synonymous from the annotation result of the text pair. If the text pair is annotated with 1, this indicates that the text pair is synonymous; if the text pair is annotated with 0, this indicates that the text pair is not synonymous.

(2) Using a word vector dictionary to obtain a quantization matrix of texts in the text pair.

In this step, it is feasible to first obtain characters included by texts in the text pair; then use the word vector dictionary to respectively determine feature vectors of the characters included by the respective texts, namely, use feature vectors in the word vector dictionary to represent characters included in the texts; finally join the obtained feature vectors corresponding to respective characters together, thereby obtaining the quantization matrix of texts in the text pair.

For example, if the obtained text pair is P and Q, since each text pair consists of a series of Chinese or English characters, it is possible to regard each text as an ordered list comprised of a series of characters. For example, the text P may be represented as $P=[p_1, p_2, \ldots, p_m]$ and the text Q may be represented as $Q=[q_1, q_2, \ldots, q_n]$, wherein m and n respectively represent a length of texts P and Q; $p_m$ represents the $m^{th}$ character in the text P; $q_n$ represents the $n^{th}$ character in the text Q.

Here, the text P is taken as an example for illustration. As far as the text P is concerned, it is feasible to seek in the word vector dictionary for characters consistent with each character $p_i$ ($i \in \{1, 2 \ldots m\}$) in the text P, then map feature vectors corresponding to the found characters to respective characters included in the text P, namely, represent each character in the text P as the feature vector corresponding to the character in the word vector dictionary, then join the obtained feature vectors together to thereby obtain the quantization matrix of the text P. For example, it is feasible to use $\vec{p}_1$ (representing the feature vector of the character $p_1$ in the word vector dictionary) to represent $p_1$, and $\vec{p}_2$ represent $p_2$, and so on so forth, and after obtaining feature vectors corresponding to all characters, use the following equation to obtain the quantization matrix $p_{1:m}$ of the text P:

$$p_{1:m} = \vec{p}_1 \oplus \vec{p}_2 \oplus \ldots \oplus \vec{p}_m$$

In the equation, $p_{1:m}$ represents the quantization matrix of the text P; $\vec{p}_1$ to $\vec{p}_m$ represent the feature vectors corresponding to all characters in the text P; $\oplus$ represents a joining operator in a row direction.

Likewise, the quantization matrix of the text Q may be represented as $q_{1:n} = \vec{q}_1 \oplus \vec{q}_2 \oplus \ldots \oplus \vec{q}_n$.

Specifically, the word vector dictionary used in the present embodiment may be built in the following manner:

First, obtain characters included in all text pairs in the training samples, build a set in which there are no repetitious characters, and call this set as a dictionary. In addition, since the built the dictionary might not cover characters of all languages, it is also feasible to add a character string "UNK" to the dictionary to represent characters that do not appear in the dictionary to make the built dictionary more perfect.

Then, set a feature vector for each character in the dictionary to obtain the word vector dictionary. Setting the feature vector for each character means setting dimensions of the feature vectors corresponding to each character and feature values on respective dimensions. For example, it is feasible to set dimensions of the feature vectors as d, set feature values on respective dimensions as random numbers in $$\left[ -\frac{6.0}{\sqrt{d}}, \frac{6.0}{\sqrt{d}} \right],$$

and additionally set the character string "UNK" as a 0 vector. It may be appreciated that the feature vectors corresponding to respective characters will be adjusted during a training process of the synonymy discriminating model. More specifically, the feature values on respective dimensions of feature vectors corresponding to respective characters will be optimized and adjusted as the training process proceeds. The optimizing and adjusting process of the word vector dictionary will be described below in detail.

(3) Regard the quantization matrix of respective texts as input of the convolutional neural network, regard a synonymy annotation result corresponding to the text pair as output of the convolutional neural network, and train the convolutional neural network to obtain the synonymy discriminating model.

In this step, it is feasible to input the quantization matrix of texts of a certain text pair obtained from the above step into the convolutional neural network as input of the network, regard synonymy annotation results corresponding to the text pair as output of the convolutional neural network, and train the convolutional neural network. A training target of the convolutional neural network is to minimize a loss value, and adjust parameters according to the loss value. A process of adjusting according to the loss value will be described below in detail.

The training process of the convolutional neural network may be performed in the following manner:

1) Perform convolution processing for the quantization matrix of the texts at a convolutional layer according to a preset step length and window length, and use the obtained convolutional features to form a convolutional feature matrix of the texts.

Wherein parameters of the convolutional layer comprise a filter module parameter $\omega^h$ and a bias parameter $b^h$, and $\omega_i^h$ represents the $i^{th}$ filter in k filters. The text P is taken as an example to illustrate a process of obtaining the convolutional feature matrix of the text P:

if the obtained quantization matrix of the text P is $p_{1:m}$, a process of using convolutional layer parameters $\omega_i^h$ hand $b^h$ to perform a convolutional operation one time for it is:

First, cut out character strings of a preset window length in turn with a preset step length on the text P having a length m, wherein preferably the preset step length is 1, the preset window length is h, and a text cutting result is represented as $p_{j:j+h-1}$; secondly, convolutional operation is performed one time for the cutting result in conjunction with parameters $\omega_i^h$ and $b^h$ to obtain a convolution result $c_{i,j}^{P,h}$ of the cutting result. The convolution result $c_{i,j}^{P,h}$ may be obtained by calculating with the following equation:

$$c_{i,j}^{P,h} = f(\omega_i^h \cdot p_{j:j+h-1} + b^h)$$

In the equation, $c_{i,j}^{P,h}$ represents the convolution result, $f(x)$ is a nonlinear function tan h, $\omega_i^h$ represents a filter parameter, $p_{j:j+h-1}$ represents a text cutting result, and $b^h$ represents a bias parameter.

Since a total of m−h+1 segments of character strings may be cut from the text P having the length m, the convolutional operation is performed one time for each segment of character string, and the convolutional feature of the text P is obtained as $c_i^{P,h}$. It may be represented as $c_i^{P,h}=[c_{i,1}^{P,h}, c_{i,2}^{P,h}, \ldots, c_{i,m-h+1}^{P,h}]$; in addition, since the filter module in the convolutional layer includes a total of k filters, the convolutional feature matrix $C^{P,h}$ of the text P is obtained through the following equation:

$$C^{P,h}=[c_1^{P,h},c_2^{P,h},\ldots,c_k^{P,h}]^T$$

In the equation, $C^{P,h}$ represents the convolutional feature matrix of the text P, k represents the $k^{th}$ filter in the filter module, and T represents a transposition operator.

Likewise, the convolutional feature matrix $C^{Q,h}$ of the text P is obtained through the following equation:

$$C^{Q,h}=[c_1^{Q,h},c_2^{Q,h},\ldots,c_k^{Q,h}]^T$$

2) Performing multi-granularity pooling processing for the convolutional feature matrix at the pooling layer, to respectively obtain multi-granularity semantic features of the texts.

In the present embodiments, two kinds of granularities are used for illustration. In this step, it is feasible to perform pooling processing of different directions for the convolutional feature matrix obtained in the above step, to respectively obtain semantic features representing two kinds of different granularities. The two kinds of granularities are respectively a text whole-level granularity, which may be considered as coarse granularity, and a text passage-level granularity, which may be considered as fine granularity.

Since convolutional features in the convolutional feature matrix of the text summarize semantics of continuous text passages of any segment of preset window length in the text, most typical features are selected therefrom as semantic features of a portion of the text, and semantic features $s^{P,h}$ and $s^{Q,h}$ of continuous text passages of the preset window length of the texts P and Q may be respectively obtained through the following equations:

$$s^{P,h}=[\max([c_{1,*}^{P,h}]),\max([c_{2,*}^{P,h}]),\ldots,\max([c_{k,*}^{P,h}])]$$

$$s^{Q,h}=[\max([c_{1,*}^{Q,h}]),\max([c_{2,*}^{Q,h}]),\ldots,\max([c_{k,*}^{Q,h}])]$$

In the equations, $s^{P,h}$ and $s^{Q,h}$ respectively represent semantic features of continuous text passages of the preset window length h of the texts P and Q, and max represents solving a maximum value for the convolutional features, and k represents the $k^{th}$ filter.

Furthermore, if the character string of the preset window length is the longest semantic passage that can be covered by the convolutional operation, length passages (1, 2, . . . , h) of all covered character strings are considered comprehensively, and text whole semantic features $S^P$ and $S^Q$ of the texts P and Q are respectively obtained through the following equations:

$$S^P=(s^{P,1}\oplus s^{P,2}\oplus\ldots\oplus s^{P,h})^T$$

$$S^Q=(s^{Q,1}\oplus s^{Q,2}\oplus\ldots\oplus s^{Q,h})^T$$

In the equations, $S^P$ and $S^Q$ respectively represent text whole semantic features of the texts P and Q; h represents the length of the cut character string, namely, the preset window length; $\oplus$ represents a joining operator; T represents a transposition operator.

Regarding the text convolutional feature matrix, it is further possible to obtain the semantic features of the text passages in addition to obtaining the text whole semantic features. Here, it is possible to use the following equations to obtain semantic features $g^{P,h}$ and $g^{Q,h}$ of continuous text passages of the preset window length in the texts P and Q:

$$g^{P,h}=[\max([c_{*,1}^{P,h}]),\max([c_{*,2}^{P,h}]),\ldots,\max([c_{*,m-h+1}^{P,h}])]$$

$$g^{Q,h}=[\max([c_{*,1}^{Q,h}]),\max([c_{*,2}^{Q,h}]),\ldots,\max([c_{*,n-h+1}^{Q,h}])]$$

In the equation, $g^{P,h}$ and $g^{Q,h}$ respectively represent semantic features of continuous text passages of the preset window length h in the texts P and Q; max represents solving a maximum value for the convolutional features; m−h+1 represents the number of continuous text passages in the text P; n−h+1 represents the number of continuous text passages in the text Q.

Then, it is possible to join semantic features of all text passages having a length ranging from 1 to h, and employ the following equations to obtain semantic features $G^P$ and $G^Q$ of text passages of the texts P and Q:

$$G^P=(g^{P,1}\oplus g^{P,2}\oplus\ldots\oplus g^{P,h})$$

$$G^Q=(g^{Q,1}\oplus g^{Q,2}\oplus\ldots\oplus g^{Q,h})$$

In the equations, $G^P$ and $G^Q$ respectively represent semantic features of text passages of the texts P and Q; h represents the preset window length; $\oplus$ represents a joining operator.

Therefore, in the step, it is possible to, by performing pooling processing of two different directions for the convolutional feature matrix of the text, respectively obtain the text whole-level semantic features with a coarse granularity and the text passage-level semantic features with a fine granularity of the texts P and G.

3) Using semantic features with the same granularity corresponding to texts in the text pair to build matching feature vectors with granularities of the text pair.

In this step, it is feasible to use the text whole-level semantic features of texts obtained from the above step to build a text whole-level matching feature vector which may be represented with $X^{SLM}$; use the text passage-level semantic features of texts obtained from the above step to build a text passage-level matching feature vector which may be represented with $X^{MGM}$. Then, it is feasible to join the text whole-level matching feature vector and the text passage-level matching feature vector, to obtain a matching feature of the text pair which may be represented with $X^{GSM}$.

The text whole-level matching feature vector $X^{SLM}$ may be obtained using the following equation:

$$(X^{SLM})^T=(S^P-S^Q)^T\oplus(S^P\odot S^Q)^T$$

In the equation, $X^{SLM}$ represents the text whole-level matching feature vector of the text pair; $S^P$ and $S^Q$ respectively represent the text whole-level semantic features of the texts P and Q, $\oplus$ represents a joining operator; $\odot$ represents performing multiplication operation for two vectors at a corresponding position.

The text passage-level matching feature vector $X^{MGM}$ may be obtained using the following equation:

$$X^{MGM}=G^P(G^Q)^T$$

In the equation, $X^{MGM}$ represents the text passage-level matching feature vector of the text pair; T represents a transposition operator.

The matching feature of the text pair may be obtained using the following equation:

$$(X^{GSM})^T=(X^{SLM})^T\oplus(X^{MGM})^T$$

In the equation, $X^{GSM}$ represents the matching feature of the text pair; $X^{SLM}$ represents the text whole-level matching feature vector; $X^{MGM}$ represents the text passage-level matching feature vector; T represents a transposition operator.

4) Mapping the matching feature of the text pair to the synonymy annotation result of the text pair at a fully connected layer, and using an error between a mapping result and the annotation result to adjust parameters of the convolutional neural network and the word vector dictionary.

In the step, it is feasible to regard the matching feature $X^{GSM}$ obtained in the above step as input, use a classifier parameter α and a bias parameter β to obtain the mapping result, and use ŷ to represent the mapping result. The mapping result ŷ may be obtained with the following equation:

$$\hat{y} = \frac{1}{1 + e^{-(\alpha^T X_{GSM} + \beta)}}$$

In the equation, ŷ represents a synonymy mapping result of the text pair; α is the classifier parameter; β is the bias parameter.

It is feasible to, after obtaining the synonymy mapping result of the text pair, obtain an error between the synonymy mapping result and synonymy annotation result of the text pair, regard the error as the loss value, and adjust the parameters of the convolutional neural network and the word vector dictionary. It is possible to obtain the error between the synonymy mapping result and synonymy annotation result of the text pair by using the following equation:

$$L = -y \log(\hat{y}) - (1-y) \log(1-\hat{y})$$

In the equation, L represents the error between the mapping result and the annotation result; y represents the synonymy annotation result; ŷ represents the synonymy mapping result.

Specifically, the training target of the convolutional neural network is to minimize the loss value, namely, minimize the error L between the synonymy mapping result and the synonymy annotation result of the text pair. Optionally, in a specific implementation of the present embodiment, if the error obtained in predetermined times converges, it is believed that the loss value of the convolutional neural network is minimized; it is also possible that if the obtained error converges to a preset value, it is believed that the loss value of the convolutional neural network is minimized; it is also possible that if training times exceed preset times, it is believed that the loss value of the convolutional neural network is minimized. When the loss value of the convolutional neural network is minimized, it is believed that the training process of the convolutional neural network completes and the synonymy discriminating model is obtained.

During training of the convolutional neural network, minimizing the loss value is in fact a process of using the loss value to feed back to adjust parameters of the convolutional neural network, for example, adjust the filter module and bias parameter of the convolutional layer, and adjust the classifier parameter and bias parameter of the fully connected layer.

Meanwhile, during the training of the convolutional neural network with the loss value, feature vectors corresponding to characters in the word vector dictionary may be adjusted. After iterative adjustment each time, when the convolutional neural network is trained next time, the adjusted word vector dictionary is used to perform mapping of feature vectors for characters included in the text pair. When the synonymy discriminating model is obtained upon completion of the training, it may be believed that adjustment of the feature vectors corresponding to characters in the word vector dictionary completes, and optimal values of respective feature vectors are already obtained so that the accuracy of discriminating the synonymous text can be further improved.

Figure 2:
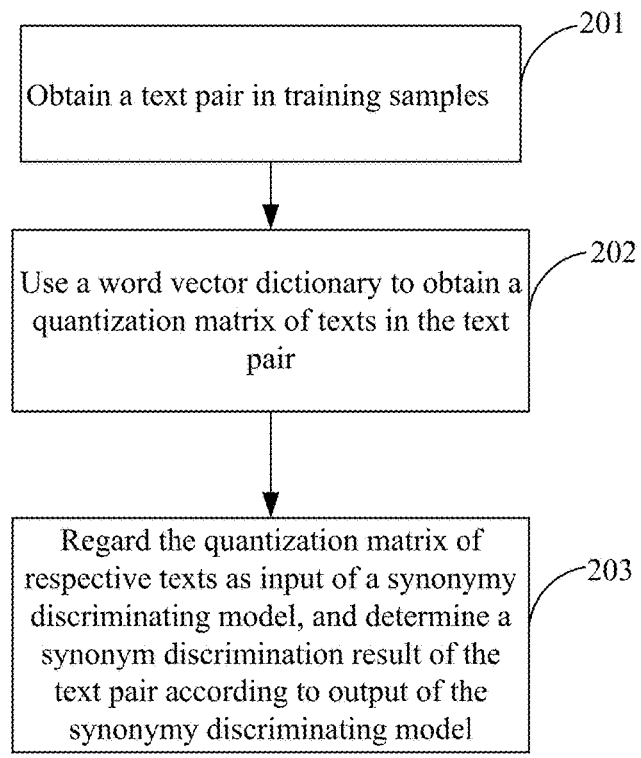
FIG. 2 is a flow chart of a method for discriminating a synonymous text according to an embodiment of the present disclosure.

FIG. 2 is a flow chart of a method for discriminating a synonymous text according to an embodiment of the present disclosure. As shown in FIG. 2, the method comprises:

At 201, obtain a text pair to be discriminated.

In this step, the obtained text pair is a text pair of any language type. For example, the text pair may be a Chinese text pair, or an English text pair or a text pair in other language types.

At 202, use the word vector dictionary to obtain the quantization matrix of texts in the text pair.

In this step, the word vector dictionary is used to map the texts in the text pair obtained from the step 201, to obtain the quantization matrix corresponding to the texts in the text pair, wherein the word vector dictionary is a word vector dictionary when the synonymy discriminating model is obtained.

The quantization matrix corresponding to texts in the text pair may be obtained using the word vector dictionary in the following manner: obtain all characters included in texts in the text pair, wherein the characters may be Chinese characters or English words; use the word vector dictionary to respectively determine feature vectors of characters included by respective texts, and map feature vectors in the word vector dictionary corresponding to characters consistent with the obtained characters to characters included by the texts; join the feature vectors mapped to respective characters, thereby obtaining the quantization matrix corresponding to texts in the text pair. The process of obtaining the quantization matrix of the texts in this step is consistent with the process of obtaining the quantization matrix of texts in the training samples when the convolutional neural network is trained, and is not detailed any more here.

At 203, regard the quantization matrix of the texts as input of the synonymy discriminating model, and determine a synonymy discrimination result of the text pair according to output of the synonymy discriminating model.

In this step, it is feasible to regard the quantization matrix of the texts obtained from step 202 as input to a pre-trained synonymy discriminating model, and then determine the synonymy discrimination result of the text pair according to a result output by the model.

In this step, it is possible to, after inputting the quantization matrix of the texts into the synonymy discriminating model, first obtain the convolutional feature matrix of the texts through the convolutional layer of the synonymy discriminating model; then perform pooling processing with two granularities for the obtained convolutional feature matrix at the pooling layer to obtain the text whole-level semantic features and the text passage-level semantic features of the texts; then use semantic features with the same granularity of the texts to build the text whole-level semantic features and the text passage-level semantic features of the text pair, and join the two kinds of semantic features to obtain the matching feature of the text pair; obtain the synonymy calculation result of the text pair at the fully connected layer according to the obtained matching feature. The convolution processing, pooling processing, joining process and mapping processing in the above process are consistent with the processing procedure when the convolutional neural network is trained, and will not be detailed any more here.

After the synonymy calculation result output by the synonymy discriminating model is obtained, the result is compared with a preset threshold. If the calculation result meets the requirement of the preset threshold, the synonymy discrimination result of the text pair is synonymous, otherwise not synonymous.

For example, if 0.5 is set as the preset threshold, if the synonymy calculation result output by the synonymy discriminating model is 0.4, this indicates that the sentence is a non-synonymous sentence; if the synonymy calculation result output by the synonymy discriminating model is 0.7, this indicates that the sentence is a synonymous sentence.

Since during the training of the synonymy discriminating model, parameters in the model and the feature vectors of characters in the word vector dictionary are optimized to optimal values, it is possible to accurately obtain the corresponding quantization matrix for the obtained text pair, and accurately obtain the synonymous discrimination result of the text pair through the synonymy discriminating model.

Figure 3:
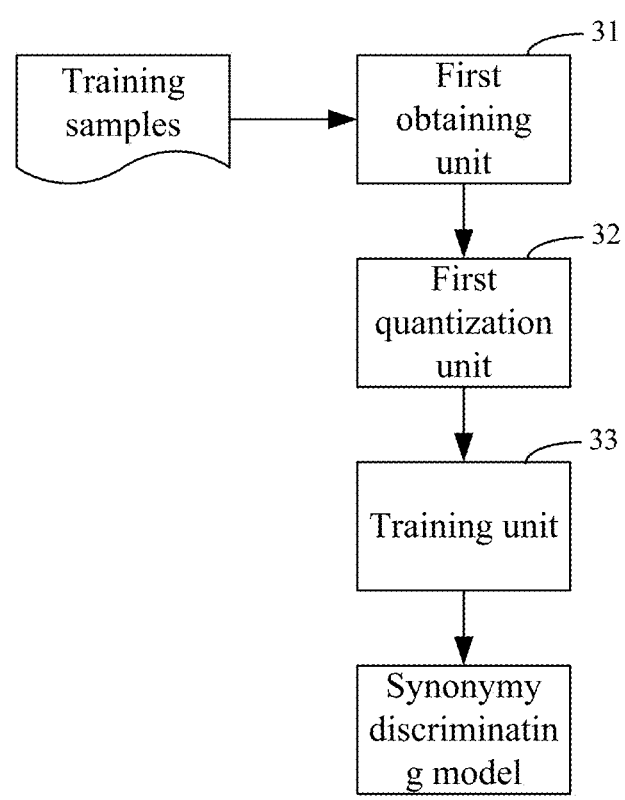
FIG. 3 is a structural diagram of an apparatus for building a synonymy discriminating model according to an embodiment of the present disclosure.

FIG. 3 is a structural diagram of an apparatus for building a synonymy discriminating model according to an embodiment of the present disclosure. As shown in FIG. 3, the apparatus comprises: a first obtaining unit 31, a first quantization unit 32 and a training unit 33.

The first obtaining unit 31 is configured to obtain a text pair in training samples.

The first obtaining unit 31 is configured to pre-annotate the text pair obtained from the training samples with a synonym result of the text pair, namely, know whether the text pair is synonymous from the annotation result of the text pair. If the text pair is annotated with 1, this indicates that the text pair is synonymous; if the text pair is annotated with 0, this indicates that the text pair is not synonymous.

The first quantization unit 32 is configured to use a word vector dictionary to obtain a quantization matrix of texts in the text pair.

The first quantization unit 32 first obtains characters included by texts in the text pair; then use the word vector dictionary to respectively determine feature vectors of the characters included by the respective texts, namely, use feature vectors in the word vector dictionary to represent characters included in the texts; finally join the obtained feature vectors, thereby obtaining the quantization matrix of texts in the text pair.

Wherein the word vector dictionary used by the first quantization unit 32 may be built in the following manner:

First, obtain characters included in all text pairs in the training samples, build a set in which there are no repetitious characters, and call this set as a dictionary. In addition, since the built the dictionary might not cover characters of all languages, it is also feasible to add a character string "UNK" to the dictionary to represent characters that do not appear in the dictionary to make the built dictionary more perfect.

Then, set a feature vector for each character in the dictionary to obtain the word vector dictionary. Setting the feature vector for each character means setting dimensions of the feature vectors corresponding to each character and feature values on respective dimensions. For example, it is feasible to set dimensions of the feature vectors as d, set feature values on respective dimensions as random numbers in $$\left[-\frac{6.0}{\sqrt{d}}, \frac{6.0}{\sqrt{d}}\right],$$

and additionally set the character string "UNK" as a 0 vector. It may be appreciated that the feature vectors corresponding to respective characters are adjusted during a training process of the synonymy discriminating model, and the feature values on respective dimensions of feature vectors are optimized and adjusted as the training process proceeds. This portion will be described below in detail.

The training unit 33 is configured to regard the quantization matrix of respective texts as input of the convolutional neural network, regard a synonymy annotation result corresponding to the text pair as output of the convolutional neural network, and train the convolutional neural network to obtain the synonymy discriminating model.

The training unit 33 is configured to regard the quantization matrix of texts of a certain text pair obtained by the first quantization unit 32 as input of the convolutional neural network, regard the synonymy annotation result corresponding to the text pair as output of the convolutional neural network, and train the convolutional neural network. A training target of the convolutional neural network is to minimize a loss function. The loss function will be described below in detail.

A specific process of training the convolutional neural network by the training unit 33 is described below in detail.

1) Performing convolution processing for the quantization matrix of the texts at a convolutional layer according to a preset step length and window length, and use the obtained convolutional features to form a convolutional feature matrix of the texts.

2) Performing multi-granularity pooling processing for the convolutional feature matrix at the pooling layer, to respectively obtain multi-granularity semantic features of the texts. In the present embodiments, two granularities are taken as an example for illustration.

3) Using semantic features with the same granularity corresponding to texts in the text pair to build matching feature vectors with granularities of the text pair.

4) Mapping the matching feature of the text pair to the synonymy annotation result of the text pair at a fully connected layer, and using an error between a mapping result and the annotation result to adjust parameters of the convolutional neural network and the word vector dictionary.

Specifically, the training target of the training unit 33 upon training the convolutional neural network is to minimize the loss value, namely, minimize an error L between the synonymy mapping result and the synonymy annotation result of the text pair. Optionally, in a specific implementation of the present embodiment, if the error obtained in predetermined times converges, the training unit 33 believes that the loss value of the convolutional neural network is minimized; it is also possible that if the obtained error converges to a preset value, the training unit 33 believes that the loss value of the convolutional neural network is minimized; it is also possible that if training times exceed preset times, the training unit 33 believes that the loss value of the convolutional neural network is minimized. When the loss value of the convolutional neural network is minimized, the training unit 33 believes that the training process of the convolutional neural network completes and the synonymy discriminating model is obtained.

During training of the convolutional neural network by the training unit 33, a process of minimizing the loss value is in fact a process of using the loss value to feed back to adjust parameters of the convolutional neural network, for example, adjust the filter module and bias parameter of the convolutional layer, and adjust the classifier parameter and bias parameter of the fully connected layer. Meanwhile, while the training unit 33 uses the loss value to train the convolutional neural network, the training unit 33 further adjusts feature vectors corresponding to characters in the word vector dictionary. After iterative adjustment each time, when the convolutional neural network is trained next time, the training unit 33 uses the adjusted word vector dictionary to perform mapping of feature vectors for characters included in the text pair. When the synonymy discriminating model is obtained upon completion of the training, it may be believed that adjustment of the feature vectors corresponding to characters in the word vector dictionary completes, so that the accuracy of discriminating the synonymous text can be further improved.

Figure 4:
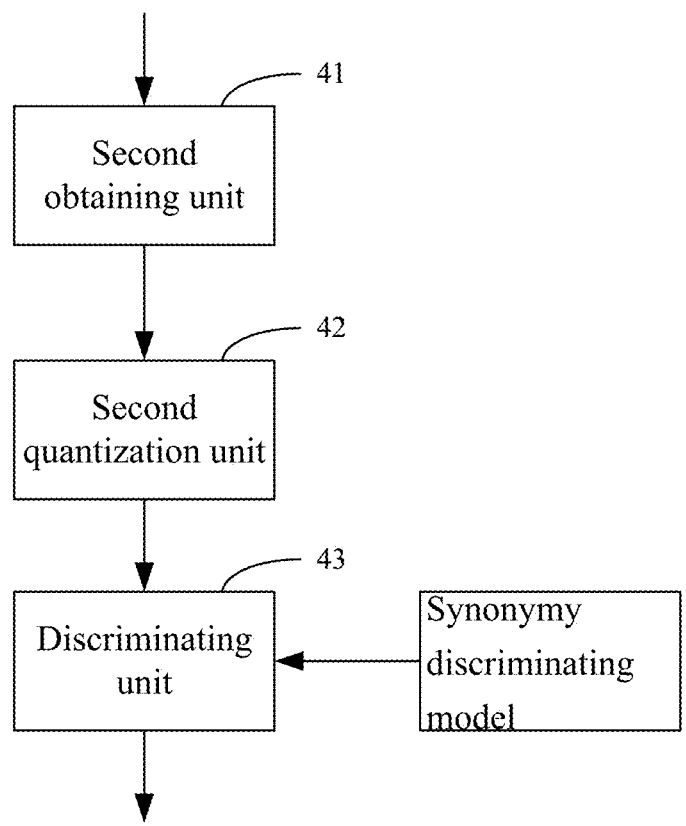
FIG. 4 is a structural diagram of an apparatus for discriminating a synonymous text according to an embodiment of the present disclosure.

FIG. 4 is a structural diagram of an apparatus for discriminating a synonymous text according to an embodiment of the present disclosure. As shown in FIG. 4, the apparatus comprises: a second obtaining unit 41, a second quantization unit 42 and a discriminating unit 43.

The second obtaining unit 41 is configured to obtain a text pair to be discriminated.

The text pair obtained by the second obtaining unit 41 is a text pair of any language type. For example, the text pair may be a Chinese text pair, or an English text pair, or a text pair in other language types.

The second quantization unit 42 is configured to use the word vector dictionary to obtain the quantization matrix of texts in the text pair.

The second quantization unit 42 uses the word vector dictionary to map the texts in the text pair obtained by the second obtaining unit 41, to obtain the quantization matrix corresponding to the texts in the text pair, wherein the word vector dictionary is a word vector dictionary when the synonymy discriminating model is obtained.

The second quantization unit 42 may obtain the quantization matrix corresponding to texts in the text with the word vector dictionary in the following manner: obtain all characters included in texts in the text pair, wherein the characters may be Chinese characters or English words; use the word vector dictionary to respectively determine feature vectors of characters included by respective texts, and map feature vectors in the word vector dictionary corresponding to characters consistent with the obtained characters to characters included by the texts; join the feature vectors mapped to respective characters, thereby obtaining the quantization matrix corresponding to texts in the text pair.

The discriminating unit 43 is configured to regard the quantization matrix of the texts as input of the synonymy discriminating model, and determine a synonymy discrimination result of the text pair according to output of the synonymy discriminating model.

The discriminating unit 43 regards the quantization matrix of the texts obtained by the second quantization unit 42 as input to a pre-trained synonymy discriminating model, and then determine the synonymy discrimination result of the text pair according to a result output by the model.

The discriminating unit 43, after inputting the quantization matrix of the texts into the synonymy discriminating model, first obtains the convolutional feature matrix of the texts through the convolutional layer of the synonymy discriminating model; then perform pooling processing with two granularities for the obtained convolutional feature matrix at the pooling layer to obtain text whole-level semantic features and text passage-level semantic features of the texts; then use semantic features with the same granularity of the texts to build the text whole-level semantic features and the text passage-level semantic features of the text pair, and join the two kinds of semantic features to obtain the matching feature of the text pair; obtain the synonymy calculation result of the text pair at the fully connected layer according to the obtained matching feature.

After obtaining the synonymy calculation result output by the synonymy discriminating model, the discriminating unit 43 compares the synonymy calculation result with a preset threshold. If the calculation result meets the requirement of the preset threshold, the synonymy discrimination result of the text pair is synonymous, otherwise not synonymous.

Figure 5:
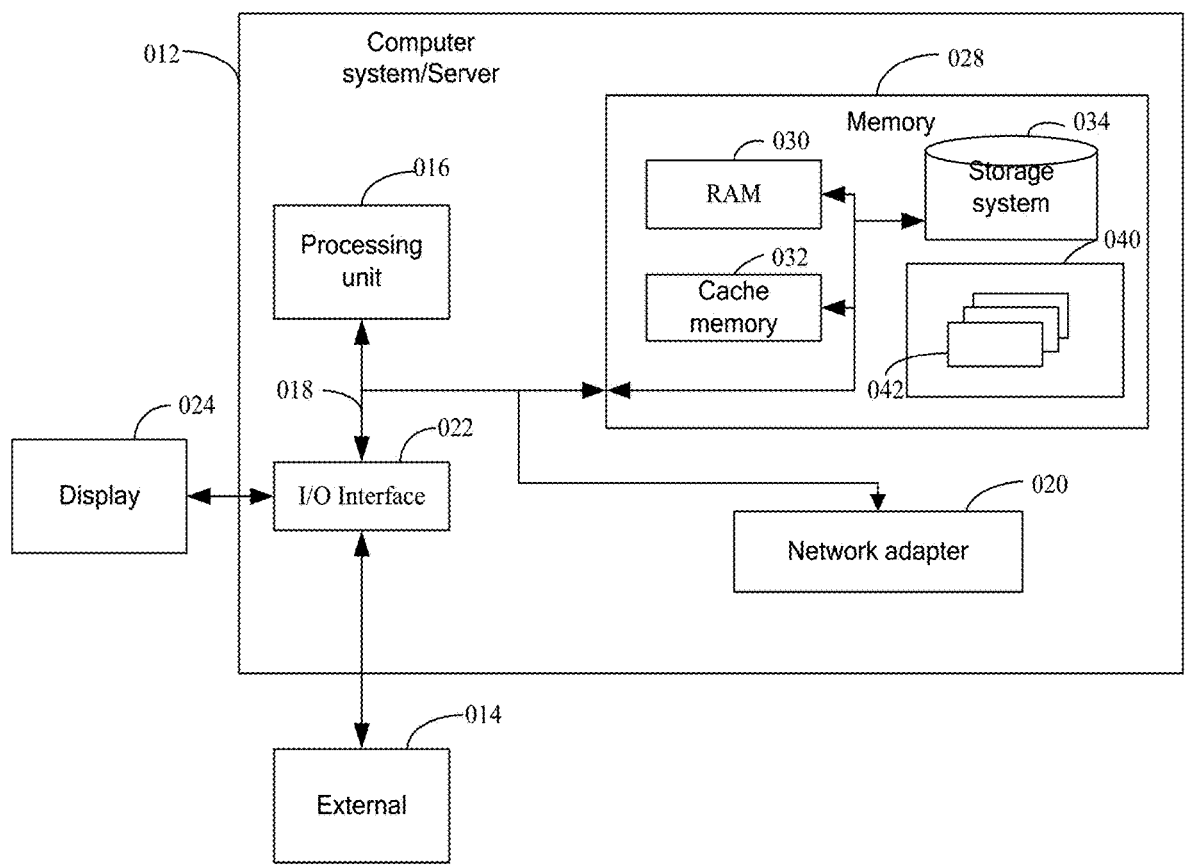
FIG. 5 is a block diagram of a computer system/server according to an embodiment of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the method for building a synonymy discriminating model, which may comprise:

obtaining a text pair in training samples;

using a word vector dictionary to obtain a quantization matrix of texts in the text pair;

regarding the quantization matrix of respective texts as input of a convolutional neural network, regarding a synonymy annotation result corresponding to the text pair as output of the convolutional neural network, and training the convolutional neural network to obtain a synonymy discriminating model.

Or again for example, implement a method for discriminating a synonymous text, which may comprise:

obtaining a text pair to be discriminated;

using a word vector dictionary to obtain a quantization matrix corresponding to the texts in the text pair;

regarding the quantization matrix of the texts as input of a synonymy discriminating model, and determining a synonymy discrimination result of the text pair according to output of the synonymy discriminating model.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of methods executed by said one or more processors may include:

obtaining a text pair in training samples;

using a word vector dictionary to obtain a quantization matrix of texts in the text pair;

regarding the quantization matrix of respective texts as input of a convolutional neural network, regarding a synonymy annotation result corresponding to the text pair as output of the convolutional neural network, and training the convolutional neural network to obtain a synonymy discriminating model.

Or may further comprise:

obtaining a text pair to be discriminated;

using a word vector dictionary to obtain a quantization matrix corresponding to the texts in the text pair;

regarding the quantization matrix of the texts as input of a synonymy discriminating model, and determining a synonymy discrimination result of the text pair according to output of the synonymy discriminating model.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

With technical solutions provided by the present disclosure being used, it is possible to, by pre-building a synonymy discriminating model based on the convolutional neural network, directly obtain the synonymy discrimination result of the text pair according to the input text pair, reduce dependence on auxiliary tools such as a word segmentation tool, part of speech analysis, and a sentence template, and improve the accuracy of the synonymy discrimination result of the text pair.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for building a synonymy discriminating model, wherein the method comprises:
obtaining a text pair in training samples;
using a word vector dictionary to obtain a quantization matrix of texts in the text pair;
regarding the quantization matrix of respective texts as input of a convolutional neural network, regarding a synonymy annotation result corresponding to the text pair as output of the convolutional neural network, and training the convolutional neural network to obtain a synonymy discriminating model;
the synonymy discriminating model is used to discriminate whether the input text pair are synonymous.

2. The method according to claim 1, wherein the using a word vector dictionary to obtain a quantization matrix of texts in the text pair comprises:
obtaining characters included by texts in the text pair;
using the word vector dictionary to respectively determine feature vectors of the characters included by the respective texts;
joining the obtained feature vectors, thereby obtaining the quantization matrix of texts in the text pair.

3. The method according to claim 1, wherein upon training the convolutional neural network, the method comprises:
performing convolution processing for the quantization matrix of the texts at a convolutional layer according to a preset step length and window length, and using the obtained convolutional features to form a convolutional feature matrix of the texts.

4. The method according to claim 3, wherein upon training the convolutional neural network, the method comprises:
performing multi-granularity pooling processing for the convolutional feature matrix at the pooling layer, to respectively obtain multi-granularity semantic features of the texts.

5. The method according to claim 4, wherein upon training the convolutional neural network, the method comprises:
using semantic features with the same granularity corresponding to texts in the text pair to build matching feature vectors with granularities of the text pair;
joining the built matching feature vectors with granularities of the text pair, to obtain a matching feature of the text pair.

6. The method according to claim 5, wherein upon training the convolutional neural network, the method comprises:
mapping the matching feature of the text pair to the synonymy annotation result of the text pair at a fully connected layer, and using an error between a mapping result and the annotation result to adjust parameters of the convolutional neural network and the word vector dictionary.

7. A method for discriminating a synonymous text, wherein the method comprises:
obtaining a text pair to be discriminated;
using a word vector dictionary to obtain a quantization matrix corresponding to texts in the text pair;
regarding the quantization matrix of the texts as input of a synonymy discriminating model, and determining a synonymy discrimination result of the text pair according to output of the synonymy discriminating model;
wherein the word vector dictionary and the synonymy discriminating model are obtained by using a method for building the synonymy discriminating model, wherein the method for building the synonymy discriminating model comprises:
obtaining a text pair in training samples;
using a word vector dictionary to obtain a quantization matrix of texts in the text pair;
regarding the quantization matrix of respective texts as input of a convolutional neural network, regarding a synonymy annotation result corresponding to the text pair as output of the convolutional neural network, and training the convolutional neural network to obtain the synonymy discriminating model.

8. The method according to claim 7, wherein the using a word vector dictionary to obtain a quantization matrix corresponding to texts in the text pair comprises:
obtaining characters included by texts in the text pair;
using the word vector dictionary to respectively determine feature vectors of the characters included by the respective texts;
joining the obtained feature vectors, thereby obtaining the quantization matrix of texts in the text pair.

9. The method according to claim 7, wherein when the synonymy discriminating model processes the quantization matrix of the texts, the method comprises:

performing convolution processing for the quantization matrix of the texts at a convolutional layer according to a preset step length and window length, and using the obtained convolutional features to form a convolutional feature matrix of the texts.

10. The method according to claim 9, wherein when the synonymy discriminating model processes the quantization matrix of the texts, the method comprises:

performing multi-granularity pooling processing for the convolutional feature matrix at the pooling layer, to respectively obtain multi-granularity semantic features of the texts.

11. The method according to claim 10, wherein when the synonymy discriminating model processes the quantization matrix of the texts, the method comprises:

using semantic features with the same granularity corresponding to texts in the text pair to build matching feature vectors with granularities of the text pair;

joining the built matching feature vectors with granularities of the text pair, to obtain a matching feature of the text pair.

12. The method according to claim 11, wherein when the synonymy discriminating model processes the quantization matrix of the texts, the method comprises:

obtaining a synonymy calculation result of the text pair at a fully connected layer according to the matching feature.

13. The method according to claim 12, wherein determining the synonymy discrimination result of the text pair according to the output of the synonymy discriminating model comprises:

if the synonymy calculation result meets the requirement of a preset threshold, the synonymy discrimination result of the text pair is a synonymous sentence, otherwise not a synonymous sentence.

14. A device, wherein the device comprises:
one or more processor;
a storage for storing one or more programs,
said one or more programs, when executed by said one or more processors, enable said one or more processors to implement a method for building a synonymy discriminating model, wherein the method comprises:
obtaining a text pair in training samples;
using a word vector dictionary to obtain a quantization matrix of texts in the text pair;
regarding the quantization matrix of respective texts as input of a convolutional neural network, regarding a synonymy annotation result corresponding to the text pair as output of the convolutional neural network, and training the convolutional neural network to obtain a synonymy discriminating model;
the synonymy discriminating model is used to discriminate whether the input text pair are synonymous.

15. The device according to claim 14, wherein the using a word vector dictionary to obtain a quantization matrix of texts in the text pair comprises:

obtaining characters included by texts in the text pair;
using the word vector dictionary to respectively determine feature vectors of the characters included by the respective texts;
joining the obtained feature vectors, thereby obtaining the quantization matrix of texts in the text pair.

16. The device according to claim 14, wherein upon training the convolutional neural network, the method comprises:

performing convolution processing for the quantization matrix of the texts at a convolutional layer according to a preset step length and window length, and using the obtained convolutional features to form a convolutional feature matrix of the texts.

17. The device according to claim 16, wherein upon training the convolutional neural network, the method comprises:

performing multi-granularity pooling processing for the convolutional feature matrix at the pooling layer, to respectively obtain multi-granularity semantic features of the texts.

18. The device according to claim 17, wherein upon training the convolutional neural network, the method comprises:

using semantic features with the same granularity corresponding to texts in the text pair to build matching feature vectors with granularities of the text pair;

joining the built matching feature vectors with granularities of the text pair, to obtain a matching feature of the text pair.

19. The device according to claim 18, wherein upon training the convolutional neural network, the method comprises:

mapping the matching feature of the text pair to the synonymy annotation result of the text pair at a fully connected layer, and using an error between a mapping result and the annotation result to adjust parameters of the convolutional neural network and the word vector dictionary.

20. A device, wherein the device comprises:
one or more processor;
a storage for storing one or more programs,
said one or more programs, when executed by said one or more processors, enable said one or more processors to implement method for discriminating a synonymous text, wherein the method comprises:
obtaining a text pair to be discriminated;
using a word vector dictionary to obtain a quantization matrix corresponding to texts in the text pair;
regarding the quantization matrix of the texts as input of a synonymy discriminating model, and determining a synonymy discrimination result of the text pair according to output of the synonymy discriminating model;
wherein the word vector dictionary and the synonymy discriminating model are obtained by using a method for building the synonymy discriminating model, wherein the method for building the synonymy discriminating model comprises:
obtaining a text pair in training samples;
using a word vector dictionary to obtain a quantization matrix of texts in the text pair;
regarding the quantization matrix of respective texts as input of a convolutional neural network, regarding a synonymy annotation result corresponding to the text pair as output of the convolutional neural network, and training the convolutional neural network to obtain the synonymy discriminating model.

21. A non-transitory storage medium including computer-executable instructions which, when executed by a computer processor, execute the method according to a method for building a synonymy discriminating model, wherein the method comprises:

obtaining a text pair in training samples;

using a word vector dictionary to obtain a quantization matrix of texts in the text pair;

regarding the quantization matrix of respective texts as input of a convolutional neural network, regarding a synonymy annotation result corresponding to the text pair as output of the convolutional neural network, and training the convolutional neural network to obtain a synonymy discriminating model;

the synonymy discriminating model is used to discriminate whether the input text pair are synonymous.

22. A non-transitory storage medium including computer-executable instructions which, when executed by a computer processor, execute the method according to method for discriminating a synonymous text, wherein the method comprises:

obtaining a text pair to be discriminated;

using a word vector dictionary to obtain a quantization matrix corresponding to texts in the text pair;

regarding the quantization matrix of the texts as input of a synonymy discriminating model, and determining a synonymy discrimination result of the text pair according to output of the synonymy discriminating model;

wherein the word vector dictionary and the synonymy discriminating model are obtained by using a method for building the synonymy discriminating model, wherein the method for building the synonymy discriminating model comprises:

obtaining a text pair in training samples;

using a word vector dictionary to obtain a quantization matrix of texts in the text pair;

regarding the quantization matrix of respective texts as input of a convolutional neural network, regarding a synonymy annotation result corresponding to the text pair as output of the convolutional neural network, and training the convolutional neural network to obtain the synonymy discriminating model.

* * * * *